June 6, 1944.　　　　F. SMITH　　　　2,350,646
PARACHUTE
Original Filed Sept. 6, 1939　　3 Sheets-Sheet 2

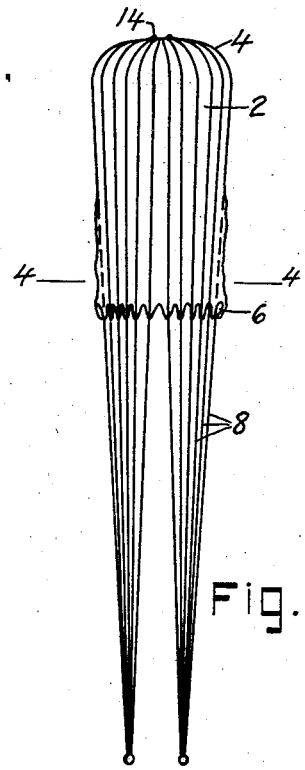
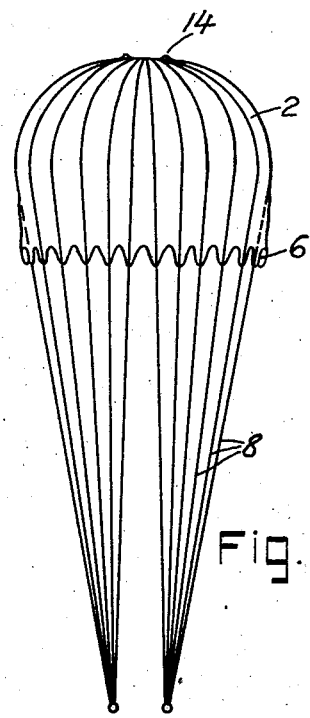
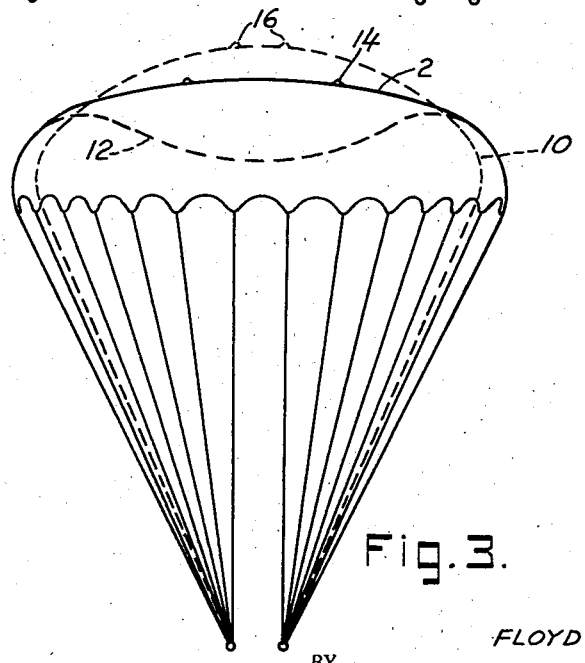

INVENTOR.
FLOYD SMITH
BY Albert Sperry
ATTORNEY

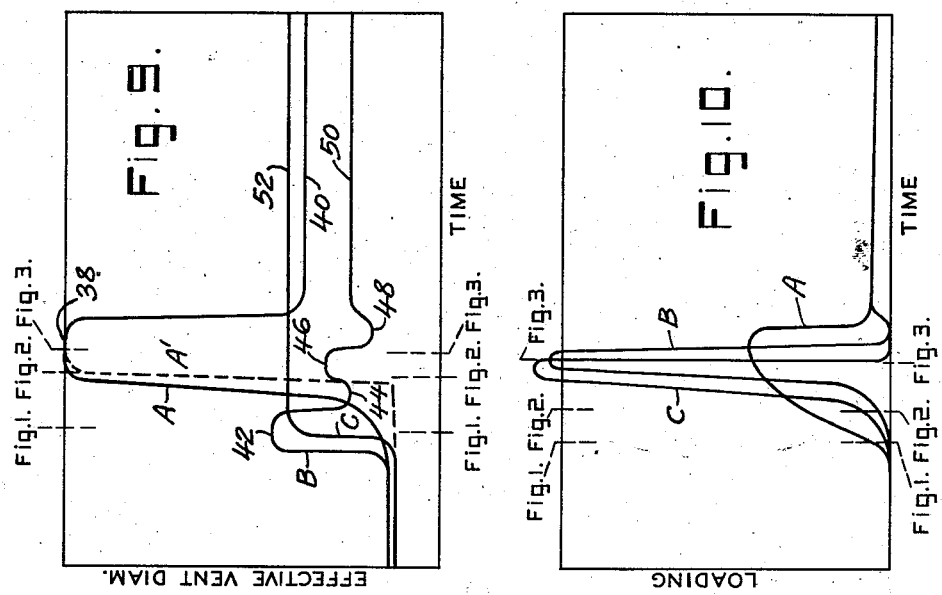
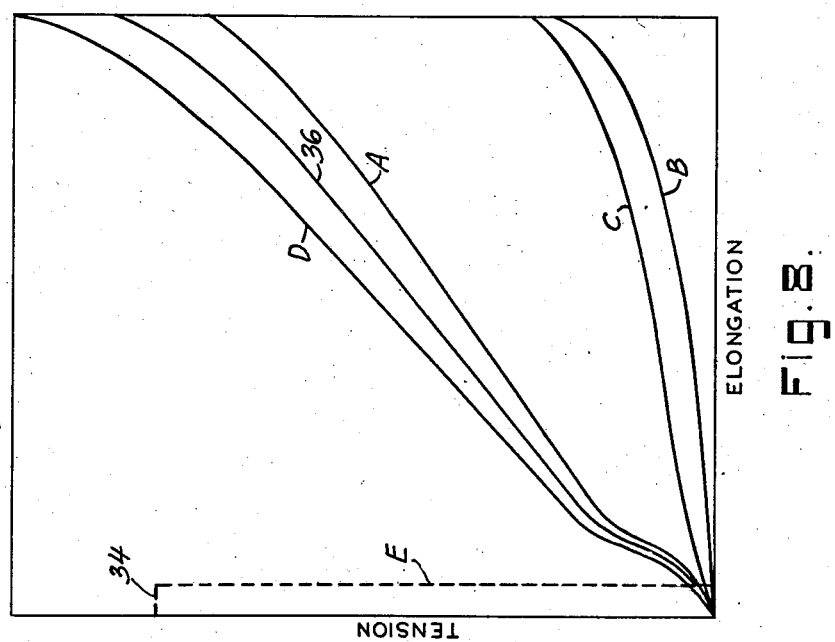

Patented June 6, 1944

2,350,646

UNITED STATES PATENT OFFICE 2,350,646

PARACHUTE

Floyd Smith, Manchester, Conn., assignor to Pioneer Parachute Company, Inc., Manchester, Conn., a corporation of Connecticut Continuation of application Serial No. 293,544, September 6, 1939. This application September 25, 1941, Serial No. 412,207

8 Claims. (Cl. 244—145)

This application is a continuation of my co-pending application Serial No. 293,544, filed September 6, 1939.

My invention relates to parachutes and particularly to parachutes which open quickly and in which shock loading of the parachute on complete opening of the canopy is minimized.

Practically all parachutes in use today are provided with a vent opening in the top of the canopy to permit the escape of air during descent so as to reduce oscillation of the parachute. The size of the vent opening also has an important influence on the operation of the parachute when it first opens and means are frequently provided for varying the effective area of the vent. The means heretofore provided for this purpose have been of two types, namely, those which are actuated in response to changes in the upwardly directed air pressure against the peak of the canopy and those which are actuated by the radially directed pull of the suspension lines of the parachute on a vent ring about the vent opening.

The standard United States Army parachute is of the former type and has a fixed vent ring to which the suspension lines are attached. Above the vent ring is located a collar or closure having an elastic member therein which tends to pucker the collar and draw it toward a closed position. The collar is forced upward and is opened by air pressure thereon but is drawn downward and closed by the elastic means so that the effective area of the vent opening is varied in response to changes in air pressure thereon.

The standard army parachute is 24 feet in diameter and has a fixed vent opening 18 inches in diameter. When released from an aeroplane traveling 100 miles per hour the peak of the canopy is subjected to a blast of air which enters the folds of the skirt and flows into the peak of the canopy causing the canopy to expand outward from the peak toward the skirt until fully opened. When the canopy has been expanded to a diameter of 5½ feet, which occurs almost instantly upon impact of the air against the peak of the canopy, the pressure against the canopy and closed collar is approximately .05 pound per square inch or a total pressure of about 12.7 pounds. The elastic member employed to pucker the collar over the vent of a standard army parachute is formed of material which is elongated 300% by the application of a tension of 6 pounds thereto and under the conditions of first opening of the parachute the pressure on the collar is sufficient to cause it to be raised and opened to substantially its maximum diameter permitting air to escape and relieving the pressure on the peak of the canopy. Thereafter when the canopy has reached its fully opened position and on shock loading of the parachute the pressure per square inch acting against the collar is reduced approximately 30% to .035 pound per square inch or a total of about 8.9 pounds and as a result the elastic member in the collar tends to draw the collar inward and downward reducing the effective area of the vent opening and serving to cause the parachute to descend slowly and safely.

Those parachutes in which the area of the vent ring is altered in response to the radially directed pull of the suspension lines on a vent ring are provided with an elastic which extends about the vent for yieldably closing the vent. Such constructions operate in a somewhat different manner from the standard army parachute for the reason that the tension on the vent ring is varied in response to the tension on the suspension lines and is initially small but increases as the parachute opens and while deceleration of the parachute and load is taking place, and thereafter decreases material when the rate of descent becomes constant. Thus, for example, when a parachute 24 feet in diameter is opened to a diameter of 5½ feet and while descending at a rate of about 65 feet per second with a load of 175 lbs. the radially directed pull of the suspension lines on the vent ring produces a circumferentially directed tension on the vent ring of approximately 28 pounds whereas when the canopy has opened to a diameter of 10 feet and as deceleration increases the circumferentially directed tension on the vent ring is increased to about 88 pounds. When the parachute reaches its fully opened and shock loading position it is approximately 20 feet in diameter and the rate of descent is decreased very rapidly. The tension on the vent ring is thereby increased rapidly and the suspension lines produce a circumferentially directed tension on the vent ring which is in the neighborhood of 353 pounds. After shock loading the parachute continues to descend at a substantially constant speed and since there is little or no further deceleration of the parachute and load the tension on the suspension lines is decreased and the circumferentially directed tension on the vent ring is reduced to about 31 pounds and remains at approximately this figure until the load reaches the ground.

It will be noted that while the air pressure per square inch upon the canopy is initially high and is decreased as the canopy opens, the pull of the suspension lines on the vent ring is initially low and produces a circumferentially directed tension thereon which is greatly increased as the canopy opens and deceleration takes place. This tension increases to a maximum during shock loading and thereafter decreases to but little more than that applied during the initial stages of opening of the canopy.

These differences between the amount and time of application of air pressure on the canopy and the pull of the suspension lines on the vent ring have not been fully appreciated heretofore. The elastic means employed in parachutes having a vent ring of variable diameter therefore have been constructed and designed to relieve the strains on the canopy due to the sudden impact and pressure of air against the peak of the canopy during the initial stages of the opening of the parachute. When using elastics which are sufficiently yieldable to permit substantially full opening of the vent in response to the tension produced thereon during the initial stages of opening of the parachute. No closing of the vent opening takes place after the first impact has been relieved because the tension on the vent ring is increased greatly as the canopy opens further and deceleration takes place. Even after shock loading and during normal descent the tension on the vent ring does not fall below that produced during the initial stages of opening of the canopy. For this reason the maximum opening of the vent permissible in prior constructions using an elastic in the vent ring has been relatively small and has been limited to that which will prevent such escape of air from the peak of the canopy that further opening of the canopy will be prevented.

While the variable opening of the vent in parachutes as heretofore constructed has served a very definite purpose the vent controlling means of the prior art have had a tendency to cause the canopy of the parachute to open slowly. In fact it is my belief that such constructions have been responsible, in some instances at least, for the failure of parachutes to open fully, since by relieving the initial internal air pressure and permitting the escape of air from the peak of the canopy lateral flow of the air is retarded and opening of the canopy to its full diameter is delayed. This delay is further increased by the formation of a chimney effect due to the draft of air that enters the lower end of the partially opened skirt of the canopy and passes out through the vent opening creating a suction within the unopened canopy. Photographs of partially opened parachutes confirm this belief in that they show the gores of the canopy drawn inward from the suspension lines to positions in which the effective diameter of opening of the skirt is materially reduced and the amount of air which can enter the canopy is greatly restricted.

The problems presented by the release of parachutes from modern aeroplanes traveling at high speeds have also introduced serious problems due to the resulting increase in shock loading on opening of the canopy at high speeds. Vents small enough to insure proper opening of the canopy do not permit the escape of sufficient air to effect the gradual application of the load to the canopy whereas vents large enough to reduce the shock load cause the parachutes to open slowly and to descend at dangerous speeds.

In accordance with my invention these objections to constructions of the prior art are overcome and a novel type of parachute provided which operates to insure quick opening of the canopy and to reduce shock loading on complete opening thereof. These results are attained by the use of means which prevent or restrict opening of the vent during initial stages of opening of the canopy whereby the air which first enters the canopy is prevented or restricted in its escape and serves to transmit pressures radially outward from the peak of the canopy and cause the canopy to open rapidly. Thereafter the vent is opened and its area is increased as the canopy opens further until the area of the vent approaches a maximum which materially exceeds that heretofore permissible and is so proportioned with respect to the diameter of the canopy that a relatively large amount of air is allowed to pass through the vent and the descent of the parachute is slowed down relatively gradually, prolonging and greatly reducing the shock loading. After shock loading of the parachute and after deceleration thereof the tension on the vent ring decreases and the area of the vent opening is decreased to that which will insure slow, safe landing of the parachute.

One of the objects of my invention is to provide a novel type of parachute constructed to cause the canopy thereof to open quickly.

Another object of my invention is to reduce the shock loading of parachutes.

A further object of my invention is to provide a parachute which is safe and effective for use at relatively low altitudes.

Another object of the present invention is to provide a parachute which is adapted for use in jumping from aeroplanes traveling at relatively high speeds.

A particular object of my invention is to provide a parachute having a vent opening with novel means for varying the area thereof.

Another object of my invention is to provide a parachute with a vent ring constructed to restrict or prevent opening of the vent during the initial stages of opening of the canopy and to permit maximum opening thereof on the approach of shock loading of the parachute.

Another object of my invention is to provide a parachute with means operable to reduce the area of the vent opening after shock loading of the canopy.

These and other objects and features of my invention will appear from the following description thereof in which reference is made to the figures of the accompanying drawings.

In the drawings:

Fig. 1 is a diagrammatic representation of a parachute as it appears during the initial stages of opening.

Fig. 2 is a similar diagrammatic illustration of a parachute in an intermediate stage of opening.

Fig. 3 is a diagrammatic illustration of a parachute as it appears on reaching a fully opened and shock loading position.

Each of Figs. 8, 9 and 10 is a graph indicating certain characteristics of parachutes by means of curves.

Figure 4:
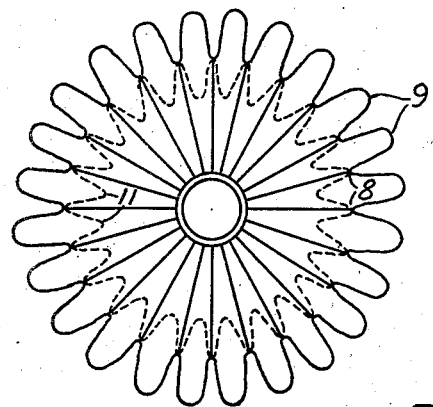
Fig. 4 is a sectional view of a parachute canopy taken on the line 4—4 of Fig. 1 showing the partially opened skirt.

The illustrations of Figs. 1, 2 and 3 represent successive stages of opening of the canopy of a parachute. During the initial stages of opening and generally about one second after release the canopy 2 of a parachute assumes the shape indicated in Fig. 1 wherein the peak 4 is expanded while the lower portions of the canopy adjacent the skirt 6 are drawn inward by the suspension lines 8 to which the parachute harness is attached. In an ideal descent the gores of material between the suspension lines are expanded outward as shown at 9 on Fig. 4 so that a large volume of air enters the canopy. When the gores are drawn inward as shown in dotted lines at 11 in Fig. 4 the amount of air entering the canopy is restricted and the canopy can only open slowly or may fail to open completely.

When the parachute has reached a partially opened position such as that of Fig. 2 the parachute cannot fail to open fully since the skirt of the parachute is expanded sufficiently to receive a large volume of air. Thereafter the parachute expands to the position indicated in Fig. 3 in which the canopy is fully opened and at which time the shock loading of the parachute takes place. After shock loading the diameter of the parachute decreases somewhat and reaches a stable form as indicated in dotted lines 10 of Fig. 3. However, before reaching this condition and immediately after shock loading the top of the canopy is usually depressed by the inertia of the following column of air and may assume a position as indicated by the dotted line 12 of Fig. 3.

The vent ring of the parachute is indicated at 14 and while I prefer that it be closed completely it is shown in Fig. 1 to be open to a small diameter, say 8 inches for a parachute 24 feet in diameter which is only about 3% of the diameter of the canopy. In Fig. 2 the vent ring is expanded to a diameter of approximately 20 inches or nearly 7% of the diameter of the canopy while in the shock loading position of Fig. 3 the diameter of the vent reaches a maximum which may be as high as 6 feet or even more or up to 25% of the diameter of the canopy. However, after shock loading of the parachute and on decrease in the diameter of the canopy the vent is decreased in diameter to about 18 to 30 inches or about 10% of the diameter of the canopy, as indicated by the dotted lines 16 in Fig. 3 so that the parachute will descend slowly and safely. It will thus be seen that the diameter of the vent on shock loading of the parachute is so large that great volumes of air are allowed to escape and the rate of descent of the parachute is decreased relatively slowly until the tension on the suspension lines is reduced sufficiently to permit closing of the vent to a small diameter.

The form and construction of the vent ring and of the canopy and other elements of the parachute may be varied considerably in utilizing my invention. In general, however, I have found that the best results are obtained when the maximum diameter of the vent is equal to from 15 to 25%, and preferably about 20% of the diameter of the parachute canopy. The use of such large vents obviously would not be possible unless some vent restricting means are employed to prevent opening of the vent to its full diameter in response to the first impact of air entering the canopy, for if the vent were to open the air would flow freely through the vent and would not flow outward to expand the skirt of the canopy. Parachutes having vents large enough to relieve shock loading therefore must also embody some means for restricting the initial area of the vent.

Figure 6:
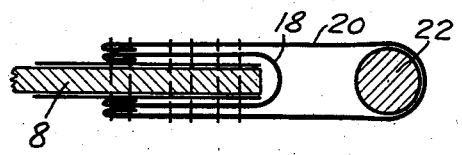
Fig. 6 is a cross sectional view of the vent ring shown in Fig. 5 taken on the line 6—6 thereof.

While the load may be transmitted to the canopy by any suitable means and the tension applied to the vent ring through the fabric of the canopy or otherwise I prefer to use a construction such as that shown in Fig. 6 wherein the vent ring is formed with a marginal tape 18 which binds the edge of the fabric of which the canopy is formed and to which the ends of the suspension lines 8 are secured. A hem of material 20 is applied over the tape 18 and loosely encloses an elastic member 22. Thus the suspension lines 8 are secured to the hem so as to draw the hem outward to elongate the elastic member and increase the diameter of the vent opening while the elastic member tends to draw the hem inward to close the vent opening.

Figure 5:
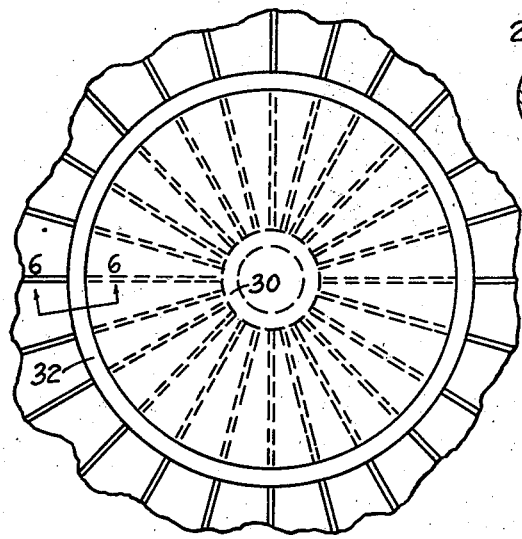
Fig. 5 is a plan view of a portion of the canopy of a parachute adjacent the vent opening illustrating a typical construction embodying my invention.
Figure 7:
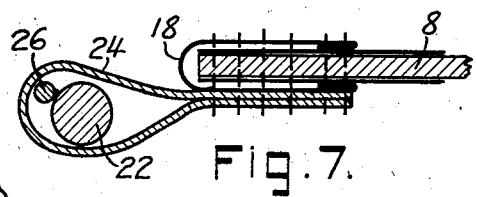
Fig. 7 is a sectional view similar to Fig. 6 illustrating an alternative type of vent ring construction embodying my invention.

In the construction of Fig. 7 a number of spaced loops of tape 24 are secured to the tape 18 of the vent ring and extend about the elastic member 22 in place of the continuous hem construction of Fig. 6. This construction permits ready inspection and replacement of the elastic member. In order to insure the desired restriction in opening of the vent I also prefer to provide the vent with a break cord indicated at 26 in Fig. 7 to prevent any expansion whatever of the vent opening until a predetermined tension not less than about 25 pounds has been applied to the vent ring by the pull of the suspension lines thereon. The strength of the break cord may be considerably higher than 25 pounds and in its preferred form the break cord has a strength of 120 pounds so that the vent opening is maintained closed or of small diameter as shown in dotted lines 30 in Fig. 5 until the canopy has expanded to a diameter exceeding that represented by Fig. 2 so that it cannot fail to open fully. Thereafter upon rupture of the break cord the vent ring is expanded rapidly to nearly its maximum diameter as shown in full lines at 32 in Fig. 5 permitting the ready escape of air from the canopy. In this way when the canopy reaches its fully opened position shock loading thereof is prolonged and reduced. This is of particular advantage when the parachute is used for release from aeroplanes traveling at high speed or in other situations wherein the shock loading of parachutes is relatively great or must be reduced to a minimum.

If no break cord is used the elastic or vent controlling member employed should be of such strength or be so formed that it will materially restrict expansion of the vent opening in response to the first impact of air entering the canopy.

The elastic or vent controlling member should also be of such strength or so formed that it will reduce the area of the vent after shock loading of the parachute so that the parachute will descend slowly and safely.

In order to attain these advantages of my invention the elastic member employed should have a modulus of elasticity or a modulus of stretch such that the tension required to stretch the elastic to the maximum diameter of the vent is less than the pull of the suspension lines on the vent during shock loading but is greater than the pull thereon after shock loading and when the parachute is in the static condition of normal descent. When so constructed the elastic will permit expansion of the vent to allow the escape of sufficient air to cause the parachute to decelerate slowly and yet will reduce the area of the vent after shock loading to insure slow descent and safe landing of the user.

When no break cord is used the modulus of elasticity or stretch of the elastic for low tensions, corresponding to the pull of suspension lines on the vent ring when the parachute has opened to the position of Fig. 1, also should be great enough to prevent substantial expansion of the vent.

By way of illustration, the elastic member used in a parachute 24 feet in diameter should be of such a type that it will not be elongated or permit an increase in diameter of the vent opening of more than 100% when the elastic is subjected to a tension of 20 pounds by the pull of the suspension lines on the vent ring. Preferably the material used is elongated not more than 100% when subjected to a tension of 28 pounds or more. The elastic member also should be capable of elongation to at least 500% of its normal length so as to permit expansion of the vent ring to its maximum diameter without danger of breaking. A tension of at least 55 pounds should be required to elongate the elastic member 300% and a tension of at least 80 pounds should be required to elongate it 500%. The initial or unexpanded diameter of the vent ring should not exceed about 12 inches and the vent is preferably wholly closed by a break cord. The fully expanded diameter of the vent ring in a parachute 24 feet in diameter is preferably about 60 inches but it may be 6 feet or in some cases even more. However, these dimensions and the yielding characteristics of the elastic member employed may be varied considerably depending upon the diameter and type of parachute in which the invention is embodied, the load it is designed to carry and the speed and altitude at which it is intended to be released and at which it may land with safety. The landing speed of parachutes carrying equipment may generally exceed the landing speed for parachutes worn by aviators and parachute troops.

In order to further illustrate the characteristics of constructions embodying my invention reference is made to the curves of Figs. 8, 9 and 10. However, it should be understood that these curves are not drawn to any particular scale since it is not intended that the invention should be limited thereby.

Referring to Fig. 8 I have shown the characteristics of typical elastic means used in constructions embodying my invention by the curve A wherein tension is represented by ordinates and elongation is represented by abscissae. By way of contrast the characteristics of the elastic member used in the standard army parachute are shown by the curve B, whereas the characteristics of elastic members used in prior expanding vent ring constructions are represented by the curve C. The elastic member used to determine the curve A actually consisted of 11 of the elastic members from standard army parachutes or in other words, 11 of the members used to plot the curve B. A more satisfactory elastic member for use in constructions embodying my invention and formed of 13 of the elastics of curve B is represented by the curve D of Fig. 8.

Constructions having a break cord restricting expansion of the vent ring when subjected to tension exceeding the strength of the break cord show characteristics corresponding to the curve E wherein the portion 34 represents the period during which the application of tension to the construction is less than that required to rupture the break cord and the tension on the elastic is therefore zero. The portion 36 of curve E represents the expansion of the elastic member after the break cord had been broken.

Referring to Fig. 9 the diameter of the vent opening is indicated by ordinates whereas time is indicated by abscissae, the time corresponding to successive stages of opening of the canopy being indicated by the lines Fig. 1, Fig. 2 and Fig. 3. The curve A of Fig. 9 represents the characteristics of constructions having my invention whereas curve B is characteristic of the standard army parachute and curve C indicates the characteristics of expanding vent ring parachutes of the prior art. From this diagram it would be noted that the vent ring of constructions embodying my invention does not expand appreciably until after the parachute has passed through the condition represented by Fig. 1 and is approaching Fig. 2. When a break cord is employed the time at which the vent ring is permitted to expand may be controlled at will to delay expansion of the vent still further as represented by the dotted curve A'.

After expanding to the maximum diameter represented by the point 38 in curves A and A' the vent opening is reduced and remains substantially constant as represented by the portion 40 of curve A.

In contrast with constructions embodying my invention the effective opening of the vent of the standard army parachute takes place prior to or during the period at which the parachute assumes the position of Fig. 1 and expands to its maximum diameter as indicated by the point 42 on curve B. Thereafter as the canopy opens and the pressure of air against the surface of the canopy decreases the diameter of the opening in the collar decreases until it reaches the point 44 immediately prior to the time when the parachute assumes the position of Fig. 3. On shock loading of the parachute the collar is opened somewhat as indicated by the point 46 of curve B after which the collar again is drawn inward by its elastic member. The following column of air usually depresses the center of the top of the canopy just after shock loading and when its descent is rapidly retarded so that the vent generally closes further as shown by the point 48 of the curve B but ultimately the vent assumes a diameter corresponding to the position 50 of curve B.

Curve C of Fig. 9 indicates the manner of opening of the vent rings of prior expanding vent ring constructions. As shown the vent is expanded to its maximum diameter upon opening of the parachute to the position of Fig. 1 and thereafter since the tension on the vent ring increases and always exceeds the contracting force of the elastic member the vent remains in its fully expanded position as represented by the portion 52 of the curve C.

Referring to Fig. 10 in which shock loading is represented by ordinates and time by abscissae it will be noted that the shock loading of curve A which is representative of parachutes embodying my invention begins at approximately the time when the parachute reaches a condition as indicated in Fig. 2 and increases relatively gradually so that it is prolonged beyond the time indicated by opening of the canopy to the position of Fig. 3. This is in contrast with the sudden and relatively great shock loading indicated by curve B of Fig. 10 which represents the characteristics of a standard army parachute and is much less than curve C which represents the shock loading of expanding vent ring parachutes of the prior art.

Since my invention may be embodied in parachutes of the flat type, the conical type or any other design and may be used in parachutes of any desired diameter and for use under varying conditions of operation it will be apparent that the form, construction and arrangement of the parts should be so chosen as to produce the desired results under the particular conditions presented in each case. However, the functional relation of the elements to obtain the advantages of my invention will be apparent from the foregoing description thereof. It should therefore be understood that the particular forms of my invention shown in the drawings and herein described are intended only to be illustrative of typical embodiments of my invention and are not intended to limit the scope thereof.

I claim:

1. In a parachute having a canopy provided with an expandable vent opening in the center thereof, the combination of means controlling the operation of said vent including two elements one of which positively restricts expansion of said vent and is so proportioned with respect to the diameter of said canopy that it will be broken only upon the application to the canopy of forces incident to a descent and after the canopy has opened to an effective diameter of at least 20% of the actual diameter of said canopy, the other of said means being yieldable and so proportioned with respect to the diameter and loading of said canopy during descent as to reduce the diameter of said vent after shock loading of the canopy.

2. In a parachute having a canopy with a vent opening therein, the combination of means for varying the effective area of said vent opening comprising a break cord, the strength of which is so proportioned with respect to the actual diameter of the canopy as to restrict the area of the vent opening when the peak only of the canopy is expanded and to be ruptured on further opening of the canopy and prior to shock loading of the parachute and means for restricting the area of said vent opening after shock loading of the parachute.

3. In a parachute having a canopy with an expandable vent opening therein, the combination of a break cord of sufficient strength to prevent expansion of said vent opening in response to upwardly directed pressure of air against the peak of the canopy, means responsive to change in the effective area of said canopy for breaking said cord, and means released on breaking of said break cord operable to reduce the diameter of said vent opening after shock loading of said parachute.

4. A parachute having a canopy with a vent in the top thereof, suspension lines connected to the canopy and tending, when under load, to open the vent to its maximum diameter, and means for controlling the area of said vent, comprising a break cord for preventing said vent from expanding until a predetermined tension, less than that incident to shock loading, is applied to the break cord, and elastic means connected to the canopy adjacent the vent and having a modulus of elasticity, when placed under tension sufficient to expand the vent to its maximum diameter, which modulus is less than the pull of the suspension lines on the canopy when the parachute is subjected to shock loading but is greater than the pull thereof when the parachute is in the static condition of subsequent normal descent whereby the elastic means permit the vent to expand to its maximum diameter on shock loading of the parachute and thereafter reduce the area of the vent to insure slow safe landing of the parachute load.

5. In a parachute having a canopy at least 20 feet in diameter with an expandable vent in the top thereof, the combination of a break cord extending about the vent and of such strength that it will prevent expansion of said vent in response to the forces applied to the canopy during a descent and when the canopy has opened to an effective diameter of approximately 20% of the actual diameter of the canopy, said break cord being of insufficient strength to prevent expansion of said vent when said canopy has opened to an effective diameter exceeding 50% of the actual diameter of the canopy.

6. A parachute having a canopy with a vent opening in the top thereof having a maximum unrestricted diameter equal to from about 15 to 25% of the diameter of the canopy, suspension lines connected to said canopy and tending, when loaded, to cause said vent to open to its maximum diameter, and a break cord connected to the vent and restricting the opening of the vent, said break cord being of such strength that it will be broken only by the application of tension exceeding that resulting from opening of the parachute canopy to at least 20% of its full diameter but less than that resulting from opening of the canopy to its shock loading position.

7. A parachute canopy having a diameter of at least 20 feet and having a vent opening in the top thereof the maximum unrestricted diameter of which vent is in the neighborhood of 20% of the diameter of the canopy, a vent ring extending about said opening and connected to the canopy, suspension lines passing over the canopy and connected to the vent ring, a break cord extending about the vent ring and of such strength that it will break when subjected to the tension resulting from opening of the canopy to a diameter exceeding 20% of its full diameter, and an elastic ring connected to said vent ring and having a modulus of elasticity, when stretched by expansion of the vent to its maximum diameter, which exceeds the pull of the suspension lines on the vent ring when the parachute is in the static condition of normal descent, whereby said elastic ring serves to reduce the area of the vent after shock loading of the parachute.

8. A parachute having a canopy with a vent in the peak thereof which is expandable to a diameter equal to at least 15% of the diameter of the canopy, elastic means extending about said vent and suspension lines connected to the canopy so that the application of tension to the suspension lines tends to cause said vent to expand, the elastic means being so constructed and its properties being so proportioned with respect to the size and loading of the canopy that it restricts the diameter of the vent to substantially 3% or less of the diameter of the canopy when the canopy is unloaded and during the application of tension thereto resulting from opening of the canopy in free fall to a diameter of 20% of its full diameter, and permits expansion of the vent to substantially 15% or more of the diameter of the canopy on shock loading of the canopy and thereafter reduces the vent to about 10% of the diameter of the canopy during normal descent of the canopy at a substantially constant speed.

FLOYD SMITH.